Nov. 4, 1941.      R. L. HARTER      2,261,468
FRICTION ACTUATED SLEEVE VALVE
Filed June 24, 1940      2 Sheets-Sheet 1
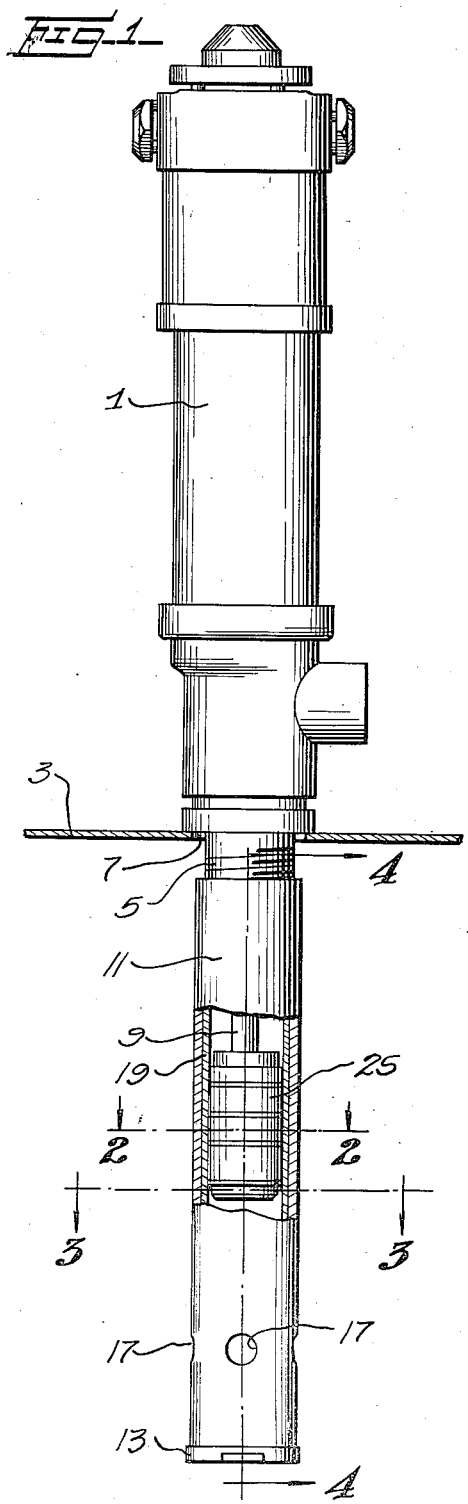
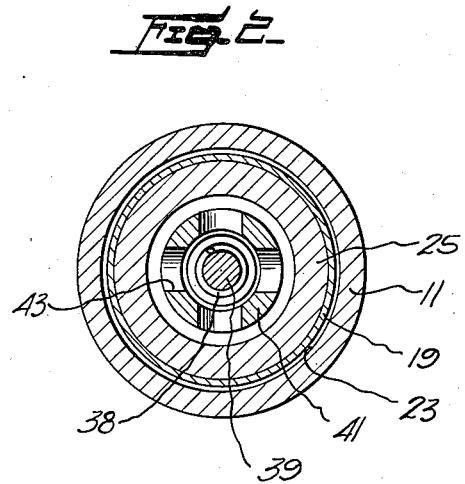
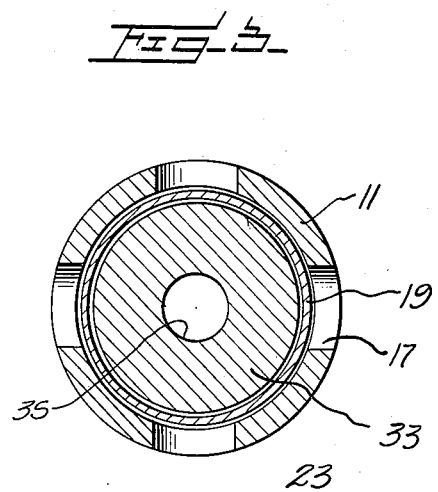
INVENTOR.
Robert L. Harter
BY Ralph S. Burns

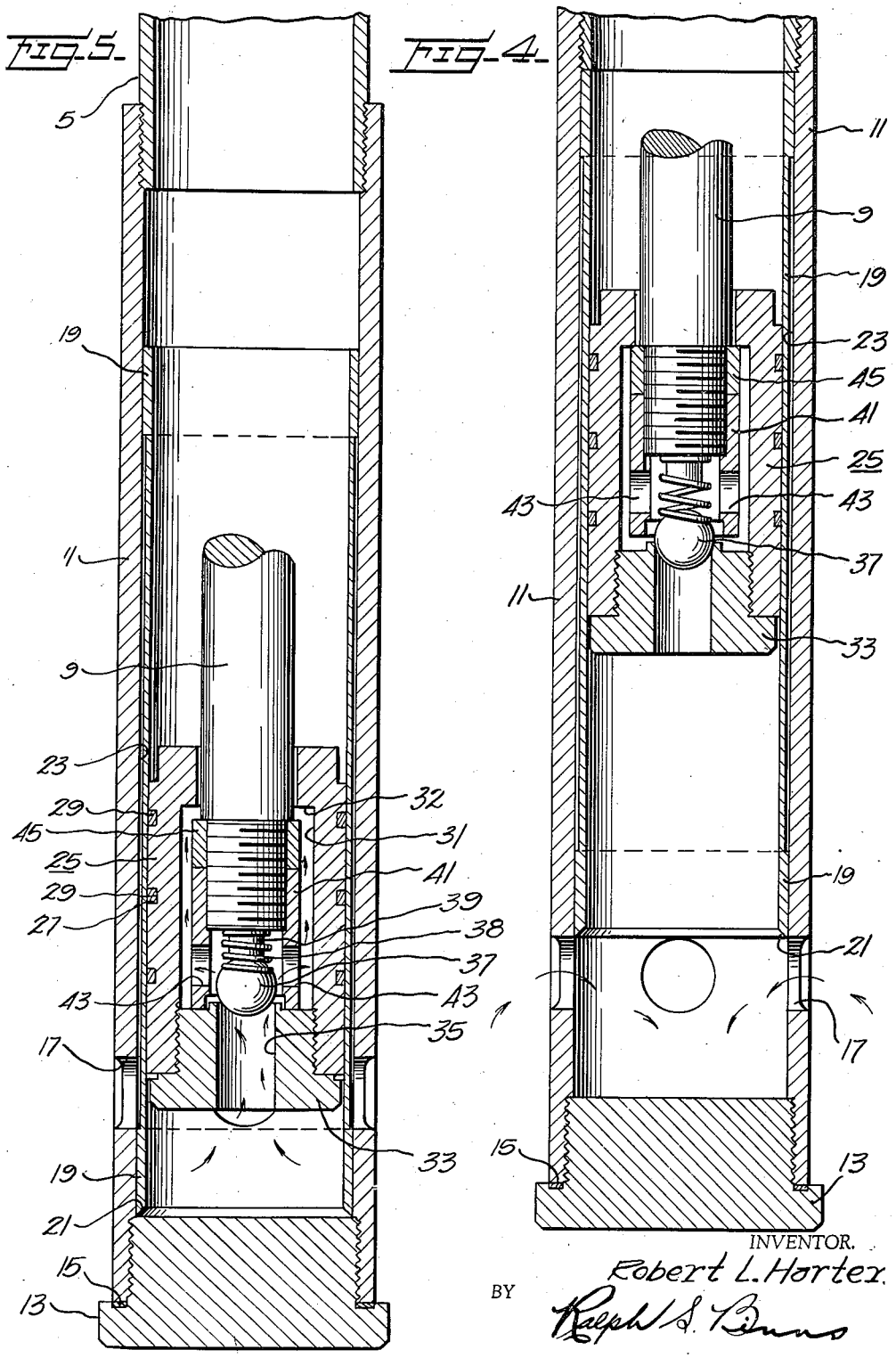

Patented Nov. 4, 1941

2,261,468

UNITED STATES PATENT OFFICE 2,261,468

FRICTION ACTUATED SLEEVE VALVE

Robert L. Harter, Cleveland, Ohio, assignor to Trabon Engineering Corporation, Cleveland, Ohio, a corporation of Ohio Application June 24, 1940, Serial No. 341,991

1 Claim. (Cl. 103—163)

My invention pertains to pumps and more particularly to an improved foot valve for pumps.

It is an object of my invention to provide an improved foot valve for pumps which will be of a simple, rugged construction having positive operating characteristics especially suitable for pumping heavy bodied fluids and plastic material.

It is a further object of my invention to provide a foot valve for pumps comprising, a tubular valve casing adapted to be immersed in a fluid to be pumped, an aperture in the side wall of the casing for passing fluid into said casing, a piston reciprocatably disposed in the valve casing and being of smaller diameter than the inside diameter of the valve casing to provide an annular space therebetween, a tubular valve sleeve of a suitable diameter and thickness disposed in the space between the piston and the inner side walls of the valve casing and arranged for slidable movement actuated by frictional engagement with the piston, means for limiting the movement of the sleeve with the piston in either direction in two extreme positions for opening or closing the aperture in the side wall of the valve casing, and fluid conducting means having check valve means associated therewith for discharging fluid trapped in the end of the valve casing when the piston moves thereto.

It is also an object of my invention to provide such an improved foot valve for pumps comprising a friction operated sleeve valve having one end of the sleeve bevelled to provide a sharp edge passing over the aperture in the side wall of the valve casing.

Another object of my invention is to provide such a foot valve wherein the piston comprises a body having an aperture extending axially therethrough, the upper end of the aperture being of reduced diameter to provide an engageable shoulder, a piston rod passing freely into the piston through the upper reduced end of said aperture, a check valve seat plug being threadably secured in the lower end of the aperture in the piston body and having an aperture disposed axially therein in alignment with the rod, a ball check valve on the inner end of said aperture, and a tubular member secured on the inserted end of the piston rod and extending therefrom for forming a cage around the ball valve and for abutting the seat plug to push the piston on the down stroke.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings, disclosing a specific embodiment of my invention, in which:

Fig. 1 is a side elevational view of a pump installation, partially broken away and sectioned, showing a pump provided with a foot valve in accordance with my invention;

Figs. 2 and 3 are cross sectional views taken on lines 2—2 and 3—3 of Figs. 1 and 5;

Fig. 4 is an enlarged longitudinal sectional view taken on line 4—4 of Fig. 1 and showing the parts positioned as for the up stroke; and Fig. 5 is a similar view showing the parts positioned as for the down stroke.

Referring more particularly to Fig. 1 of the drawings, I have illustratively disclosed a pump 1 installed upon any barrel, vat, well or reservoir 3 for pumping fluid therefrom. The pump 1 may be of any well known construction having a pump casing 5 which is insertable through a suitable aperture 7 into the vat 3 from which it is desirable to pump heavy bodied fluid or plastic material. Such a pump 1 may comprise any suitable motive means, of well known construction, which serves to reciprocate a piston rod 9 which extends therefrom and passes through the pump casing 5.

In accordance with my invention, I provide a valve casing 11 which is internally threaded to screw onto and be suspended from the lower end of the pump casing 5 for immersion in the fluid in the tank 3. The length of the valve casing 11 and the pump casing 5 are such that the lower end of the valve casing is immersed in the fluid near the bottom of the tank 3, as will be understood.

As may be seen more clearly in Fig. 5, the lower end of the valve casing 11 is also internally threaded, and is closed by means of a threaded plug 13 screwed thereinto. A gasket 15 of any suitable sheet packing material may be inserted to be clamped between the lower end of the valve casing 11 and the plug 13 to make a tightly sealed joint therebetween. Opening through the side walls of the valve casing 11 are apertures or intake ports 17 for admitting the fluid to flow into valve casing from the reservoir 3. One or more of such apertures 17 may be provided of any suitable size to admit fluid with but slight resistance to flow in accordance with the cross sectional area of the valve casing 11.

A valve sleeve 19 is provided of a suitable diameter to slide snugly inside of the valve casing for closing the intake ports 17 to prevent the flow of fluid therethrough. Also the length of the valve sleeve 19 is suitably selected with reference to the length of valve casing 11 and the distance between the plug 13 and the inserted end of the pump housing casing, which are the limiting stops for limiting the movement of the valve sleeve so that the sliding sleeve when moved to the uppermost extreme position entirely clears and opens the intake ports 17.

The sleeve 19 has the lower end bevelled to provide a sharp lower edge 21 to pass closely over the intake ports 17 decreasing the tendency of small particles of solid matter to stop the sliding movement of the sleeve and to hold the intake port partially open. An extensive intermediate portion of the outer surface of the valve sleeve 19 may be cut into a slightly reduced diameter, providing a thin clearance space 23 for reducing the sliding friction between the valve sleeve and the valve casing 11, with only the end portions of the sleeve in snug sealed engagement with the valve casing.

The lower end of the reciprocating piston rod 9 carries a piston 25 which slides snugly in the valve sleeve 19 with sufficient friction to initially move the sleeve in either same direction of movement, until the advancing end of the sleeve strikes either the plug 13 at one end or the pump casing 5 at the other, and to thereafter slide in the stationary sleeve. The peripheral outer surface of the piston 25 is provided with a plurality of circumferential grooves 27 which are disposed in axially spaced relation and provided wtih resilient expanding piston rings 29 in a well known manner. The piston rings 29 serve to provide a snug sealed contact between the piston and the inside surface of the sliding valve sleeve 19 and at the same time serve to provide sufficient friction therebetween to operate the sliding valve sleeve to open and close the intake ports 17.

The piston comprises a body 25 having an aperture 31 extending axially therethrough and counterbored so that the upper end is of a smaller diameter presenting a shoulder 32 for limiting the upward movement of the piston rod 9 which is inserted loosely therein. The lower end of the aperture 31 in the piston is internally threaded to receive a check valve seat plug 33 screwed thereinto. An aperture 35 extending axially through the check valve seat plug 33 in alignment with the piston rod is closed by a ball valve 37 seated and pressed thereon by a compression spring 38 reacting between the ball and the adjacent end of the piston rod. A spring guide pin 39 projecting from the end of the piston rod toward the ball 37 is of a suitably reduced diameter to pass into the adjacent end of the spring in concentric relation. A tubular threaded member 41 is internally threaded for screwing firmly on the threaded end of the inserted piston rod. The other end of the tubular member 41 projects from the piston rod and extends around the check ball 37, forming a valve cage therefore, while also serving to abut the valve seat plug 33 to push the piston down in the sleeve 19 on the down stroke. Apertures 43 are provided in the tubular member 41 to pass fluid which flows up around the ball 37, as the piston 25 moves down. The fluid then flows up around the tubular member 41 and the piston rod 9 into the space above the piston.

On the up stroke of the rod 9, the upper end of the tubular member 41 engages the shoulder 32 and lifts the piston. If desired a threaded lock nut member 45 may be provided on the threaded end of the piston rod 9, for directly engaging the shoulder 32 in the piston body.

In operation, on the up stroke the frictional engagement of the piston therein carries the valve sleeve 19 upwardly until the upper end of this sleeve strikes the lower end of the pump casing, thus opening the intake ports 17 in the lower end of the valve casing. During the continued upward movement of the piston 25, the check valve ball 37 is seated and prevents the downward flow of fluid through the piston and fluid is drawn into the lower end of the valve casing through the intake ports 17. When the down stroke starts, the friction of the piston therein moves the valve sleeve 19 down and closes the intake ports, the lower end of the valve sleeve strikes the plug 13 and thereafter remains stationary. The continued downward movement of the piston 25 displaces the fluid previously drawn into the lower end of the valve casing, which fluid lifts the check valve ball 37 and passes up through the piston. When the piston reverses and moves upwardly, the valve sleeve is again lifted, opening the intake ports, and a charge of the fluid flows into the bottom of the valve casing. This sequence of operation continues as long as the pump rod reciprocates in the pump casing and the fluid is lifted from the tank or vat 3 to be delivered and dispensed from the pump 1 in any manner desired.

It is apparent that within the scope of this invention, modifications and different arrangements may be made other than is herein disclosed, and the present disclosure is illustrative merely, the invention comprehending variations thereof.

I claim:

A foot valve for pumps comprising, a tubular valve casing adapted to be immersed in a fluid to be pumped, an aperture in the side wall of the lower end of said valve casing, a plug in the lower end of the valve casing, the upper end of the valve casing having internal threads for attachment to the lower end of a pump casing inserted therein, a valve sleeve disposed in said valve casing for slidable movement to either one of two extreme positions limited by engagement of either end of the sleeve with either the plug or a pump casing in the opposite ends of the valve casing, said valve sleeve being suitably disposed in one extreme position for closing and in the other position for opening the aperture in the valve casing, a piston slidably disposed in said valve sleeve, said piston comprising a body having an aperture extending axially therethrough, the upper end of said aperture being of reduced diameter to provide an engageable shoulder, a piston rod passing freely into the piston through the reduced upper end of said aperture, an external thread on the inserted end of said piston rod, the lower end of the aperture in said piston being internally threaded, a check valve seat plug threadably secured in the lower end of the axial aperture in the piston, an aperture extending axially through the check valve seat plug in alignment with the piston rod, a ball adapted to seat upon the inner end of the aperture in the valve seat, a compression spring disposed between said ball and the inserted end of said piston rod to seat the ball, a tubular threaded member secured upon the threaded end of said piston rod and projecting to form a cage around said ball and to engage the valve seat plug to push the piston toward the lower end of the valve casing on the down stroke, and said tubular member being suitably apertured to pass fluid flowing up around the ball into the piston to flow freely around said tubular member and the piston rod into the space above the piston.

ROBERT L. HARTER.